(12) United States Patent
Bryans

(10) Patent No.: US 7,724,762 B2
(45) Date of Patent: May 25, 2010

(54) EFFICIENT TRANSMISSION OF PACKETS WITHIN A NETWORK COMMUNICATION DEVICE

(75) Inventor: Mark Adrian Bryans, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 259 days.

(21) Appl. No.: 11/767,659

(22) Filed: Jun. 25, 2007

(65) Prior Publication Data
US 2008/0317013 A1 Dec. 25, 2008

(51) Int. Cl.
*H04L 12/28* (2006.01)
(52) U.S. Cl. ...................................... 370/423
(58) Field of Classification Search ............... None
See application file for complete search history.

(56) References Cited

U.S. PATENT DOCUMENTS

| | | | |
|---|---|---|---|
| 5,764,895 A | 6/1998 | Chung | |
| 6,115,758 A | 9/2000 | Chen | |
| 6,222,840 B1 | 4/2001 | Walker et al. | |
| 6,289,015 B1 | 9/2001 | Warner et al. | |
| 6,301,256 B1 * | 10/2001 | Vasa | 370/401 |
| 6,748,506 B2 * | 6/2004 | Echartea et al. | 711/167 |
| 7,023,867 B1 * | 4/2006 | Park et al. | 370/419 |
| 7,139,271 B1 * | 11/2006 | Parruck et al. | 370/392 |

* cited by examiner

*Primary Examiner*—Chirag G Shah
*Assistant Examiner*—Amarnauth Persaud
(74) *Attorney, Agent, or Firm*—Steven A. Shaw; W. James Brady; Frederick J. Telecky, Jr.

(57) ABSTRACT

Systems and methods for efficient transmission of packets within a network communication device are described herein. Some illustrative embodiments include a network communication device that includes a plurality of ports (each port configured to communicate with one or more network devices), and a bus coupling the plurality of ports to each other (the bus providing a shared path for one or more bus transfers originated by a first port of the plurality of ports, and the one or more bus transfers including information). The bus includes a plurality of port map bits, a port map bit of said plurality of port map bits corresponding to a second port of the plurality of ports. The second port is configured to forward the information to the one or more network devices if the port map bit is asserted.

11 Claims, 2 Drawing Sheets

EFFICIENT TRANSMISSION OF PACKETS WITHIN A NETWORK COMMUNICATION DEVICE

BACKGROUND

As the number of networked computer systems has increased, so has the demand for high-speed networking hardware such as network switches, bridges and routers. Whereas in the past the internal bus speeds of such devices far outpaced the speeds of the networks themselves, today's networks and network switch fabrics are now capable of data transfers that are well within an order of magnitude of the internal bus speeds of the network devices used to interconnect such networks and network switch fabrics. As a result, the performance of network switches, bridges and routers has become an important factor in overall network performance and throughput. Efficient routing and transmission of packets within these network devices can be a significant and even limiting factor in the overall performance of a high-speed network and/or network switch fabric.

One technique that is sometimes used to reduce network traffic and increase network efficiency is to transmit network messages using multicast or broadcast addressing. In such addressing schemes, a single network address is assigned to either a group of devices (multicast) or to all devices (broadcast) within a network address space or sub-network. But the efficiency gains obtained through the use of multicast and broadcast messages can be adversely affected if such messages are transmitted more than once within a network switch, bridge or router. Such redundant transmissions may be necessary if the devices being addressed within the network address space or sub-network are coupled to the network switch through more than one device port.

SUMMARY

Systems and methods for efficient transmission of packets within a network communication device are described herein. Some illustrative embodiments include a network communication device that includes a plurality of ports (each port configured to communicate with one or more network devices), and a bus coupling the plurality of ports to each other (the bus providing a shared path for one or more bus transfers originated by a first port of the plurality of ports, and the one or more bus transfers including information). The bus includes a plurality of port map bits, a port map bit of said plurality of port map bits corresponding to a second port of the plurality of ports. The second port is configured to forward the information to the one or more network devices if the port map bit is asserted.

Other illustrative embodiments include a method that includes receiving on a first port of a plurality of ports within a network communication device a packet from a network-attached source device, the first port asserting a port map bit of a plurality of port map bits (the asserted port map bit corresponding to a second port of the plurality of ports within the network communication device), and the first port presenting one or more bus transfers on a shared bus within the network communication device including addressing bits that include the plurality of port map bits (the one or more bus transfers including information from the packet received on the first port).

Yet further illustrative embodiments include a network communication device that includes a plurality of means for receiving a first packet from and transmitting a second packet to one or more network devices, and means for coupling the plurality of means for communicating to each other, for providing a shared path for one or more information transfers presented by a first of the plurality of means for communicating, and for providing a plurality of mapping bits (a mapping bit corresponding to a second of the plurality of means for communicating). The second of the means for communicating is configured to transmit the second packet to the one or more network devices if the mapping bit is asserted (the second packet comprising at least part of the one or more information transfers).

BRIEF DESCRIPTION OF THE DRAWINGS

For a detailed description of illustrative embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more hardware and/or software components and may be used to refer to an electronic device, such as a network communication device, a portion of a network communication device, a combination of network communication devices, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
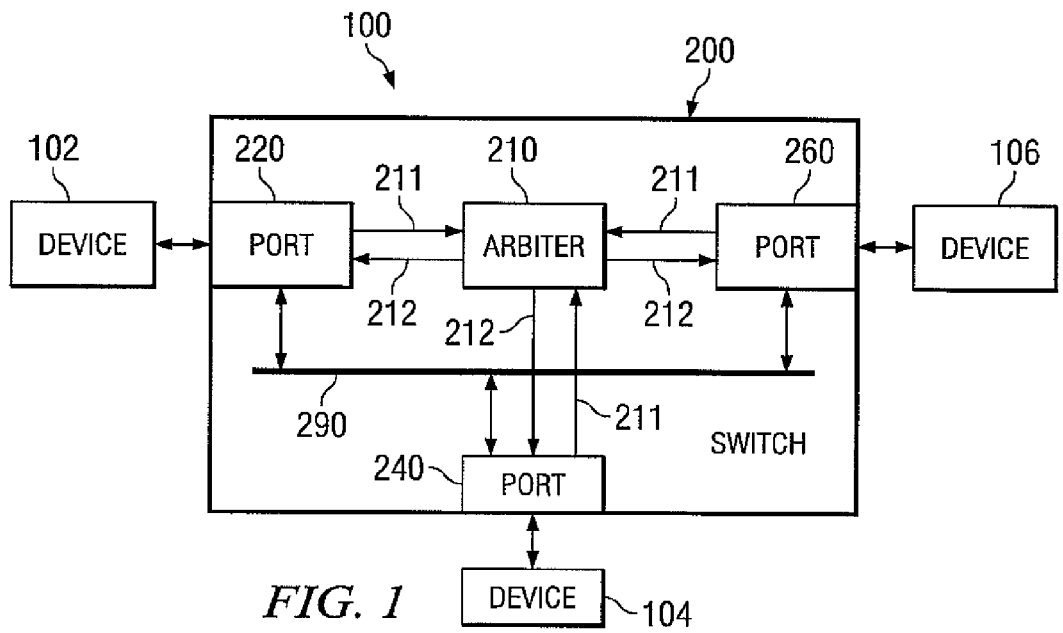
FIG. 1 shows several devices networked together using a network switch constructed in accordance with at least some illustrative embodiments.

FIG. 1 shows a network switch 200 constructed in accordance with at least some illustrative embodiments. Network switch 200 couples to several network attached devices (Devices 102-106), and can receive and/or transmit packets originating from and destined to each device. These devices couple to the switch through ports (Ports 220, 240 and 260), which each can operate as both a source and a destination port. When a packet is received from an external device on a port operating as a source port (e.g., Port 220), the packet is presented on shared bus 290 as one or more bus transfers originating from the source port. The packet is made available for re-transmission by any destination port coupled to the bus (including the source port which can also contemporaneously operate as a destination port), based upon a series of port map bits set by the source port, as described below. In at least some illustrative embodiments switch 200 includes at least one processor (not shown) that executes software that provides some or all of the functionality described herein. In other illustrative embodiments, switch 200 includes logic other than a processor that implements the functionality described herein.

Based on the destination address within the packet (e.g., an Internet Protocol (IP) address within a Transmission Control Protocol/Internet Protocol (TCP/IP) message), as well as configuration information maintained within the switch, the source port determines which destination port is coupled to the device that corresponds to the destination address of the packet. The configuration information may be based on user-provided information that is downloaded or entered via a directly connected terminal or via a web-based user interface. The configuration information may also be generated by software executing on the aforementioned processor(s) that implements a learning algorithm by which the switch monitors the source and destination addresses of the packets passing through the switch to determine which devices are coupled to which ports.

The data bits of shared bus 290 are used to transmit part or all of the received packet as one or more bus transfer from the source port (e.g., port 220) to one of the destination ports (e.g., ports 220, 240 and 260). The address bits of the bus are used to control bus transfers from the source port. The address bits include source and destination port map bits that each correspond to a port (220, 240, or 260) within switch 200. The source port map bit corresponding to the source port is set by the source port, as is the destination port map bit that corresponds to the port coupled to the destination device. One or more bus transfers (representing the received packet) are subsequently presented on shared bus 290, which is preferably a parallel bus that includes both data and address bits. The destination port corresponding to the set port map bit (e.g., Port 240) detects that the corresponding port map bit is set, and forwards the packet (reconstructed from the one or more bus transfers) to the destination device (e.g., Device 104).

The packets received from external devices by the ports of the switch 200 of FIG. 1 may also include multicast and broadcast packets. A multicast packet is a packet destined for a subset of devices within a network address space. A broadcast packet is a packet destined for all devices within a network address space. The source port determines which ports are coupled to devices within the address space of the destination multicast or broadcast address, and sets one or more destination port map bits within the bus transfer address, each set destination port map bit corresponding to a port coupled to a destination device. Also, the source port map bit corresponding to the source port is set by the source port. One or more bus transfers (representing the received packet) are presented on shared bus 290 as before, but because multiple destination port map bits are set, each port corresponding to a set destination port map bit will forward the transfers (in the form of a reconstructed packet) to one or more destination devices coupled to the port. In this manner the one or more bus transfers originated from the source port results in the distribution of the received packet to multiple destination devices coupled to multiple ports of the switch 200 of FIG. 1.

As shown in FIG. 1, each port controls a bus access request line 211 which is used to send a bus request signal to arbiter 210. Similarly, arbiter 210 controls multiple bus access grant lines 212 which are used to send a bus access grant signal to each of ports 220, 240 and 260. When a port receives a packet, the port initiates a bus access request by signaling arbiter 210 via a request line 211. The port does not initiate a bus transfer on shared bus 290 until arbiter 210 signals that access has been granted via the access grant line 212 that couples arbiter 210 to the requesting port. Thus, arbiter 210 performs an arbitration function by which arbiter 210 resolves contentions that may arise between ports concurrently attempting to perform bus transfers on shared bus 290.

Figure 2:
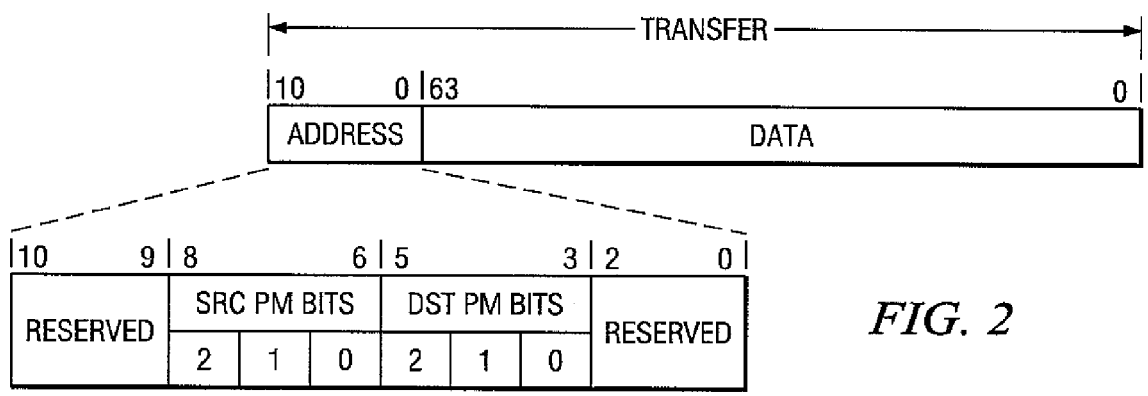
FIG. 2 shows the organization of the address and data associated with a transfer across a shared bus, in accordance with at least some illustrative embodiments.

As already noted, in at least some illustrative embodiments shared bus 290 is a parallel bus with both dedicated address and data busses. FIG. 2 illustrates an example of a distribution of the address and data bits across 11 address bits and 64 data bits. In the illustrative embodiment of FIG. 2, the data bits represent at least part of the received packet, and the address bits represent addressing and control information used internally by switch 200 to route and process bus transfers within the switch. Bits 3 through 5 represent the destination port map bits (Dst PM Bits), and bits 6 through 8 represent the source port map bits (Src PM Bits). Each source port map bit and each destination port map bit is assigned to one of the ports on the switch. In the illustrative embodiments of FIGS. 1 and 2, for example, source and destination port map bit 0 are each assigned to port 220; source and destination port map bit 1 are each assigned to port 240, and source and destination port map bit 2 are each assigned to port 260.

Figure 3:
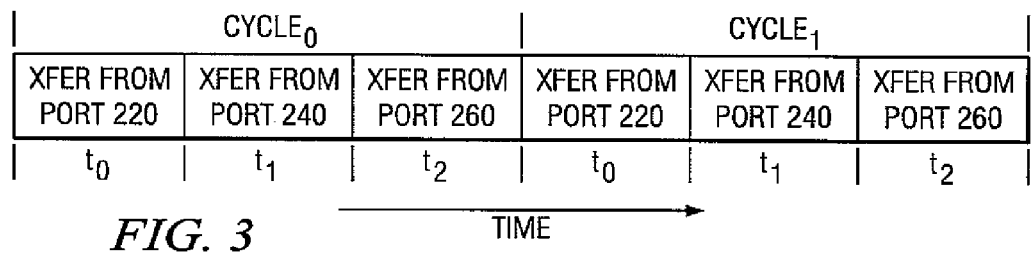
FIG. 3 shows the time-division-multiplexing of bus transfers within a network switch constructed in accordance with at least some illustrative embodiments.

Arbiter 210 receives bus access requests from each port on dedicated request lines and arbitrates bus contentions that may result from two or more requests being received at the same time. Arbiter 210 issues bus access grants to each requesting port such that only one port is allowed to execute a bus transfer at any given time. In at least some illustrative embodiments, arbiter 210 allocates the available bandwidth of shared bus 290 by operating the bus as a time division multiplexed (TDM) bus. Each port is allocated a specific time slice, which guarantees each port a specific amount of the available bandwidth. FIG. 3 shows an illustrative allocation of the bandwidth using time-division multiplexing. Referring to the illustrative embodiments of FIGS. 1 and 3, port 220 presents data transfers on shared bus 290 during time slot 0 ($t_0$). Likewise, bus transfers are presented by port 240 on shared bus 290 during time slot 1 ($t_1$) and bus transfers from port 260 are presented on shared bus 280 during time slot 2 ($t_2$). In at least some illustrative embodiments, the duration of each time slot is fixed and of the same length. A full transfer cycle is completed after the bus transfer for each port has been presented (e.g., $Cycle_0$ of FIG. 3). After a transfer cycle is completed the process repeats and another transfer cycle starts with the transmission of a bus transfer by port 220. In this manner, each destination port is capable of receiving interleaved bus transfers over the shared bus originating from multiple source ports within a single full cycle.

Although the illustrative embodiments described and shown distribute the available bandwidth equally among ports, those of ordinary skill in the art will recognize that other distributions are possible. Such distributions may include prioritization schemes that either statically or dynamically allocate more bandwidth to some ports with higher priority. Additional bandwidth may be allocated to the higher priority port by increasing the duration of the time slot of the port, or by allocating additional time slots to the port. Other bandwidth allocations and techniques will become apparent to those skilled in the art, and all such allocations and techniques are within the scope of the present disclosure. Further, although the illustrative embodiments described and shown utilize time-division multiplexing of the shared bus to arbitrate contentions between ports for access to the shared bus, other bus access allocation and arbitration techniques will become apparent to those skilled in the art, and all such bus access allocation and arbitration techniques are within the scope of the present disclosure.

Figure 4:
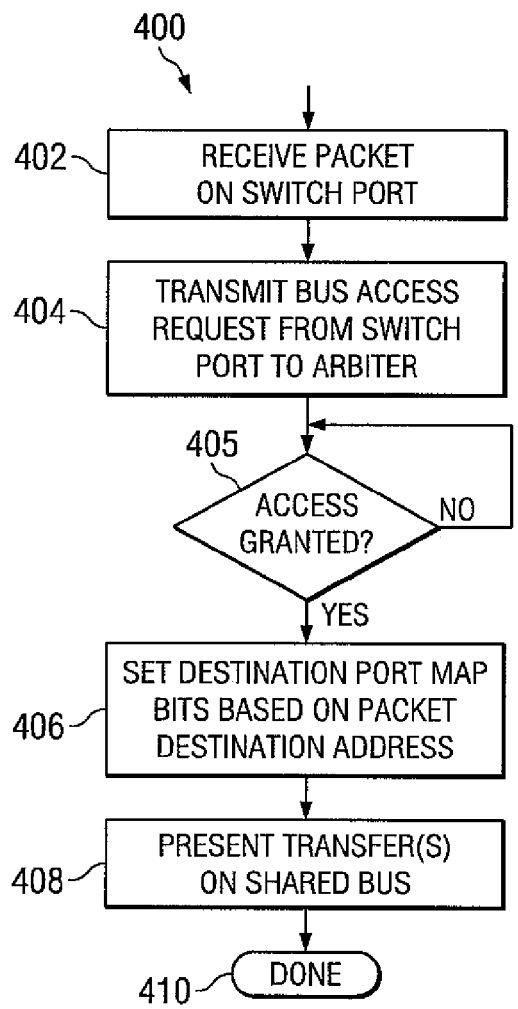
FIG. 4 shows a method for originating bus transfers within a network switch, in accordance with at least some illustrative embodiments.

FIG. 4 shows a method 400 for originating bus transfers within the network switch of FIG. 1, in accordance with at least some illustrative embodiments. A packet is received by a switch port (block 402) and a bus access request is transmitted from the switch port to the arbiter (block 404). The switch port waits until the arbiter grants access to the shared bus (block 405), after which the switch port determines from the packet destination address which ports are coupled to devices within the destination address space, and sets the destination port map bits corresponding to said ports (block 406). The received packet is presented on the shared bus as one or more bus transfers (block 408), completing the method (block 410).

Figure 5:
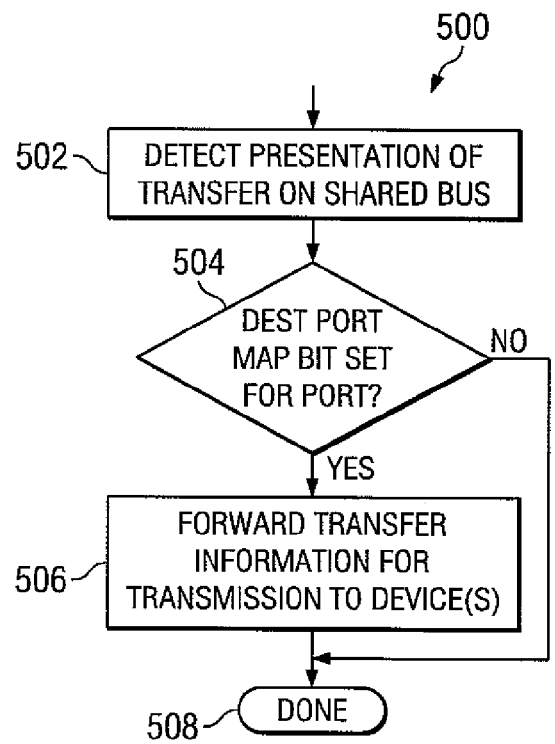
FIG. 5 shows a method for receiving bus transfers within a network switch, in accordance with at least some illustrative embodiments.

FIG. 5 shows a method 500 for receiving bus transfers originated using the method 400, in accordance with at least some illustrative embodiments. A switch port detects the presence of a bus transfer on the shared bus (block 502). If the bit within the port map that corresponds to the port is set (block 504), then the bus transfer is destined at least for that port. The information within the bus transfer (data and/or addressing information) is forwarded by the port as part of a reconstructed packet, which is transmitted to one or more devices coupled to the port that are within the address space of the destination address of the switch packet (block 506), completing the method (block 508). If the bit within the port map that corresponds to the port is not set (block 504), the switch packet is ignored, completing the method (block 508).

The above disclosure is meant to be illustrative of the principles and various embodiments of the present invention. Numerous variations and modifications will become apparent to those skilled in the art once the above disclosure is fully appreciated. For example, although the present disclosure describes network switch embodiments, other embodiments may include any number of network devices, such as network routers, network bridges and network concentrators, just to name a few. Also, although the shared bus of the illustrative embodiments disclosed is described as a parallel bus, the present disclosure is not limited to a parallel bus, and other bus architectures (e.g., high-speed serial busses) are within the scope of the present disclosure. It is intended that the following claims be interpreted to embrace all such variations and modifications.

What is claimed is:

1. A network communication device, comprising:
a plurality of ports, each port configured to communicate with one or more network devices; and
a shared time-division multiplexed bus coupling the plurality of ports to each other, the bus providing a shared path for two or more concurrent bus transfers originated by a first port of the plurality of ports, and the two or more concurrent bus transfers comprising information, wherein each of the plurality of ports is assigned an individual time slot from a plurality of time slots;
at least one of the plurality of ports is configured to detect a presenting of the concurrent bus transfer on the shared time-division multiplexed bus, wherein the concurrent bus transfers are time-division multiplexed with other bus transfers originating from other ports;
wherein the shared time-division multiplexed bus comprises a plurality of port map bits, a port map bit of said plurality of port map bits corresponding to a second port of the plurality of ports; and
wherein the second port receives time-interleaved bus transfers from two or more of the plurality of ports and is configured to forward the information to the one or more network devices if the port map bit is asserted and if the asserted port map bit corresponds to the at least one of the plurality of ports.

2. The network communication device of claim 1, wherein the time-division multiplexed bus comprises data bits used to represent the two or more concurrent bus transfers, and wherein the bus further comprises address bits that comprise the plurality of port map bits.

3. The network communication device of claim 1, wherein the time-division multiplexed bus comprises parallel data and address bits.

4. The network communication device of claim 1, wherein the first port determines which port map bits to assert based upon a destination address within a packet received from the one or more network devices.

5. The network communication device of claim 1, wherein the first port presents the two or more concurrent bus transfers on the bus during the individual time slot assigned to the first port.

6. The network communication device of claim 1, wherein the network communication device comprises a device selected from the group consisting of a network switch, a network router, a network bridge, and a network concentrator.

7. A method, comprising:
receiving on a first port of a plurality of ports within a network communication device a packet from a network-attached source device;
the first port asserting a port map bit of a plurality of port map bits, the asserted port map bit corresponding to a second port of the plurality of ports within the network communication device;
the first port presenting two or more concurrent bus transfers on a shared time-division multiplexed bus within the network communication device comprising addressing bits that comprise the plurality of port map bits, the two or more concurrent bus transfers comprising information from the packet received on the first port, wherein the first port presenting comprises time-division multiplexing the concurrent bus transfer with other bus transfers originating from other ports of the plurality of ports, each of the plurality ports individually allocated to each of a plurality of time slots; and
at least one of the plurality of ports detecting the resenting of the concurrent bus transfer on the shared time-division multiplexed bus; and
the at least one of a plurality of ports forwarding at least some of the information within the concurrent bus transfer to two or more network-attached destination devices if the asserted port map bit corresponds to the at least one of the plurality of ports.

8. The method of claim 7, further comprising the first port determining which of the port map bits to assert based upon a destination address within the packet received on the first port.

9. The method of claim 7, wherein the destination address is an Internet Protocol (IP) address.

10. The method of claim 7, wherein the destination address is a multicast address.

11. The method of claim 7, wherein the destination address is a broadcast address.

* * * * *